(12) United States Patent
Johnson (10) Patent No.: US 11,118,658 B1
(45) Date of Patent: Sep. 14, 2021

(54) DEVICE AND METHOD WITH MULTIPLE TORQUE AND SPEED RANGES

(71) Applicant: Siemens Industry, Inc., Alpharetta, GA (US)

(72) Inventor: Mark David Johnson, Northglenn, CO (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 16/851,878

(22) Filed: Apr. 17, 2020

(51) Int. Cl.
*F16H 3/54* (2006.01)
*F24F 13/14* (2006.01)

(52) U.S. Cl.
CPC ............ *F16H 3/54* (2013.01); *F24F 13/1426* (2013.01); *F16H 2200/0034* (2013.01); *F16H 2200/2005* (2013.01); *F16H 2200/2033* (2013.01); *F24F 2013/1433* (2013.01)

(58) Field of Classification Search
CPC . F24F 13/1426; F24F 2013/1433; F16H 3/54; F16H 2200/2007; F16H 2200/2005; F16D 11/10
See application file for complete search history.

(56) References Cited

U.S. PATENT DOCUMENTS

| | | | | |
|---|---|---|---|---|
| 4,555,003 A | * | 11/1985 | Phillips | F02B 41/00 123/198 F |
| 5,700,220 A | * | 12/1997 | Legner | F16H 3/54 475/129 |
| 5,720,688 A | | 2/1998 | Wilson et al. | |
| 5,890,986 A | | 4/1999 | Pritchard et al. | |
| 6,942,592 B1 | | 9/2005 | Haka | |
| 8,277,358 B2 | | 10/2012 | Gasparrini et al. | |
| 9,243,690 B2 | | 1/2016 | Forrest | |
| 10,584,800 B2 | * | 3/2020 | Ohashi | F16K 31/535 |
| 2010/0140365 A1 | | 6/2010 | Kalore | |
| 2014/0283797 A1 | * | 9/2014 | Eybergen | F02B 39/06 123/559.1 |
| 2017/0234064 A1 | | 8/2017 | Dupielet et al. | |
| 2018/0087799 A1 | * | 3/2018 | Pridemore | F24F 13/15 |

FOREIGN PATENT DOCUMENTS

| | | |
|---|---|---|
| DE | 202016105075 | 1/2018 |
| EP | 2189684 | 1/2013 |
| EP | 2577411 | 12/2016 |
| EP | 3495696 | 6/2019 |
| WO | 2019076521 | 4/2019 |

* cited by examiner

*Primary Examiner* — Stacey A Fluhart (57) ABSTRACT

There is described an epicyclic gear system and method of a flow control actuator for providing selectable torque and speed ranges. The epicyclic gear system comprises an input shaft, a gear engagement system, and an output shaft. The input shaft is configured to receive an input rotational motion. The gear engagement system is configured to receive a gear ratio command from a clutch mechanism and restrict movement of one or more gears of multiple planetary gears in response to the gear ratio command. The output shaft is configured to provide an output rotational motion based on the input rotational motion at the input shaft. The output rotational motion is different from the input rotational motion in response to restricting movement of one or more gears of the planetary gears.

16 Claims, 8 Drawing Sheets

DEVICE AND METHOD WITH MULTIPLE TORQUE AND SPEED RANGES

FIELD OF THE INVENTION

This application relates to the field of building management systems and, more particularly, to actuators of dampers, valve, and the like, for controlling the flow of gases or liquids through an industrial or other building facility.

BACKGROUND

Actuators are integral devices in building management systems, including heating, ventilation and air conditioning (HVAC) systems as well as industrial systems. Actuators can be used to rotate chilled water or steam valves, and to open and close ventilation dampers. Dampers can be used for general comfort control as well as for laboratory safety ventilation.

For example, ventilation dampers of HVAC systems may control the flow of air into a room, space, air handling unit or ventilation duct or shaft. The dampers may be completely open, closed, or at varying degrees of partially open. Further opening a damper has the effect of increasing the flow of air through the damper, while further closing a damper has the effect of decreasing the flow of air through the damper. When the air flow consists of chilled air, or heated air, then the opening and closing of dampers may be used to regulate the temperature in a space.

Some ventilation dampers are manually actuated. However, building management systems typically include automatically operated ventilation dampers, and typically large numbers of such dampers. The position of the damper (i.e. its degree of "openness") in such a system is usually under the control of an automated controller. The controller adjusts the position of the damper based on whether more or less air flow to the room is desired.

A damper actuator is the electromechanical (or other) device that converts the control signals from the controller to the motive force that physically adjusts the position of the damper. The actuator may include a motor and gear set. In some cases, an actuator is in the form of a solenoid, or motor in combination with a mechanical bias spring. Various forms of actuators are available and suitable for use.

In addition to ventilation dampers, actuators are also used to control the operations of valves in HVAC systems. A valve actuator is similar to a damper actuator in that it converts control signals into a motive force the physically adjusts the position of the valve, thereby admitting a controlled flow of chilled water; steam or other liquid through an orifice.

Many applications of dampers and valves require definitive and precise control maximize performance and/or ensure occupant safety. Unfortunately, existing systems do not provide sufficient performance or safety, or they come at a prohibitively high cost.

SUMMARY

There is provided an approach for providing efficient a precision control of one or more components of a building management systems. In particular, an epicyclic gear system (commonly known as "planetary" gearing system), combined with gear engagement systems or locking pins, provides multiple speed and torque ranges in a single actuator. The epicyclic gear system includes one or more in-line shafts in a control actuator to allow for a smaller housing, instead of the larger housings required for an offset shaft design. Additionally, the system has two different configurations for implementing different models of operation. For an automatic configuration, the model with clutching mechanisms could provide multiple speed and torque ranges in a single configuration. For a manual configuration, the model with locking pins would need to be modified manually by an installer, operator, or technician to achieve a different speed or torque range.

The above approach implements an actuator design that provides multiple speed and torque ranges in the single device. The multiple speed/torque ranges are accomplished by the selection of multiple gearing ratios that are available with epicyclic gear systems and/or with epicyclic gear sets in series, i.e., in "stacks", with each other. The approach includes the capability to alter directions by changing the clutch gripping configuration, in which the motor direction stays constant and in the same direction, while the output shaft reverses rotation. By having multiple speed and torque ranges available, a device, such as an actuator, would be allowed to replace multiple similar devices, as a "one size fits all" concept. This single device design is capable of a wide variety of configurations covering a wide range of speeds and a wide range of torques, thus aiding inventory control (and promoting inventory reduction) for various market channels that may carry this type of device. Further, the compact design of the epicyclic gear system allows the device to take-up a smaller footprint and require less materials.

The applications of the epicyclic gear system address problems with, and shortcomings of, existing gearing systems. Some applications, such as control of boiler "main" gas valves which have a high torque spring, benefit from a high torque actuator to overcome spring tension. For many gas fired boilers, a slow opening main gas valve is desirable to prevent blowing out the pilot flame and allows for the smooth establishment of a flame on the main burners. On the other hand, when a boiler is at the end a firing cycle because conditions are satisfied, or when the boiler firing cycle is interrupted/shut down by a safety control, power failure, or by an operator intervention, fast closing valve-actuator characteristic are desired. Similarly, fire/smoke dampers benefit from a high torque actuator to overcome the high spring tension to open but desire a fast response to close when a fire/smoke alarm signal is present to prevent smoke migration and for smoke containment. An inlet guide vane actuator for a centrifugal chiller may also benefit from a low speed and high torque operation for opening and a high speed and low torque operation for closing. For some embodiments, high speed and low torque operation may be followed by low speed and high torque operation for closing. For other applications, such as control of Venturi air valves, benefit from a high speed and low torque operation for opening and a low speed and high torque operation for closing. Precise control is desirable in response to determining that the initial airflow requirements are met.

One aspect is an epicyclic gear system of a flow control actuator for providing selectable torque and speed ranges. The epicyclic gear system comprises an input shaft, a gear engagement system, and an output shaft. The input shaft is configured to receive an input rotational motion. The gear engagement system is configured to receive a gear ratio command from a clutch mechanism and restrict movement of one or more gears of multiple planetary gears in response to the gear ratio command. The output shaft is configured to provide an output rotational motion based on the input rotational motion at the input shaft. The output rotational motion is different from the input rotational motion in response to, or due to, restricting movement of one or more gears of the planetary gears.

Another aspect is a method for an epicyclic gear system of a flow control actuator for providing selectable torque and speed ranges. The epicyclic gear system includes multiple planetary gears, and an input rotational motion is received at an input shaft of the epicyclic gear system. A gear engagement system receives a gear ratio command from a clutch mechanism. The gear engagement system also restricts movement of one or more gears of the planetary gears in response to the gear ratio command. An output rotational motion is provided at an output shaft of the epicyclic gear system based on the input rotational motion at the input shaft. The output rotational motion is different from the input rotational motion in response to, or due to, restricting movement of one or more gears of the planetary gears.

Yet another aspect is an epicyclic gear system of a flow control actuator for providing selectable torque and speed ranges based on a different model. The epicyclic gear system comprises an input shaft, a locking pin, and an output shaft. The input shaft is configured to receive an input rotational motion. The locking pin is configured to restrict movement of one or more gears of multiple planetary gears. The output shaft is configured to provide an output rotational motion based on the input rotational motion at the input shaft. The output rotational motion is different from the input rotational motion in response to, or due to, restricting movement of one or more gears of the planetary gears.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate the provision of selectable torque and speed ranges of an epicyclic gear system of a flow control actuator will now be described with reference to the drawings, where like reference numerals represent like elements throughout. The drawings discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the application will be described with reference to exemplary non-limiting embodiments.

The actuator provides flow control of gas or liquid elements, such as an actuator for a damper or a valve. The actuator includes the epicyclic gear system with multiple torque and speed ranges to manage the actuator for flow control of such elements. The epicyclic gear system provides the actuator with multiple torque and speed ranges, in a single device and, thus, is easily configurable. The capability for multiple speed and torque ranges, as available in the actuator, allows for one device to replace multiple actuators, such as a "one size fits all" concept. The epicyclic gear system also aids in inventory reduction for certain market channels, such as branches, wholesale distribution, VAP dealers, original equipment manufacturer (OEM) and service truck stock. The epicyclic gear system further reduces factory tooling, production lines, and factory floor space since one device replaces several devices. Just-in-time manufacturing is also expedited to fulfill.

The epicyclic gear system is smaller in size relative to existing gearing systems. The reduced physical footprint is facilitated by reduced materials required and stacking of epicyclic gear sets allows for multiple speed and torque ranges in one device. The size reduction is due in part to the epicyclic gear set members rotating around a common shaft, compared to the offset shafts used by other gearing systems having a larger physical footprint.

The epicyclic gear system is capable of changing gear ratios, speeds, and direction by holding or otherwise maintaining one or two of the three epicyclic gear members in place, thus preventing movement. For some embodiments, a mechanical, electrical, or magnetic clutching system may be used to hold one or two of the planetary gear members in place and then switch or shift to other gears members being restricted, which results in speed and torque changes.

For one model, the epicyclic gear system has the ability to shift gears shift-on-the-fly, in which speed and torque ranges are selectable based on an input control signal. The input control signal may be interpreted by a control logic module to select a particular speed or torque range that is available with the epicyclic gear system. The control logic module would then command the clutch mechanism to grip or otherwise restrict one or more of the members of the epicyclic gear system to achieve the desired speed/torque range. For another model, the epicyclic gear system is configurable for a more permanent or semi-permanent selection torque & speed range, due to the pure-hardware approach to gear configuration as opposed to the combined hardware and software approach of the former model described above.

Figure 1:
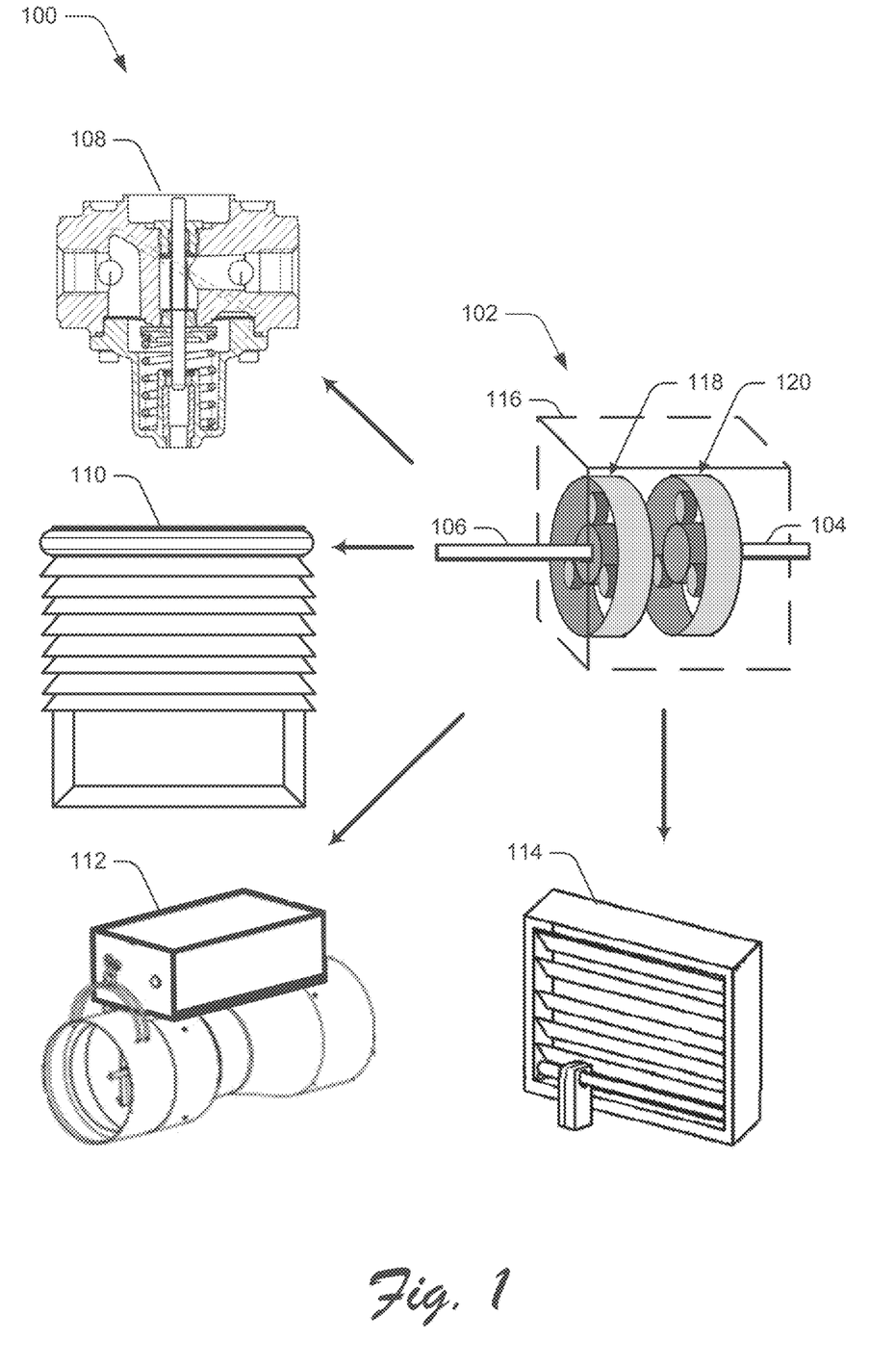
FIG. 1 is a representation of an actuator in an example implementation that is operable to employ techniques described herein in conjunction with various flow control devices.

Referring to FIG. 1, there is shown an example implementation 100 of an actuator 102 that is operable to employ techniques described herein in conjunction with various flow control devices. The actuator 102 receive input rotational motion from an input source via an input shaft 104 and provides second rotational motion to an output device via an output shaft 106. The input shaft 104 is configured to receive the input rotational motion, and the output shaft 106 is configured to provide the output rotational motion based on the input rotational motion at the input shaft. The speed and torque of the input and output shafts 104, 106 may differ depending on the design and configuration of the internal components of the actuator 102. An example of an input source that may provide the first rotational energy to the input shaft 104 is a motor. Examples of output devices that may receive the second rotational energy from the output shaft 106 includes, but are not limited to, gas valves 108 (such as an HVAC gas valve for boilers an heaters), window coverings 110 (such as blinds or shades), air valves 112 (such as a Venturi air valve), and air dampers 114, liquid valves, and the like.

The actuator 102 may include an enclosure 116 as well as one or more epicyclic gear systems 118, 120 (also known as planetary gearsets). The epicyclic gear systems 118, 120 provide different gear ratios for the input and output shafts 104, 106. The different gear ratios may provide a reduction from the first shaft 104 to the second shaft 106 or an overdrive from the first shaft to the second shaft, in which for either reduction or overdrive the rotational output may be in the forward direction or the reverse direction. The gear ratios may be generated without the need for engaging or disengaging any other gears. Where simple epicyclic gear systems provide multiple speed and torque ranges, compound epicyclic gear systems provide the same capability to a greater extent, such as greater reduction ratios, greater torque-to-weight ratios, and more flexible configurations.

Figure 2:
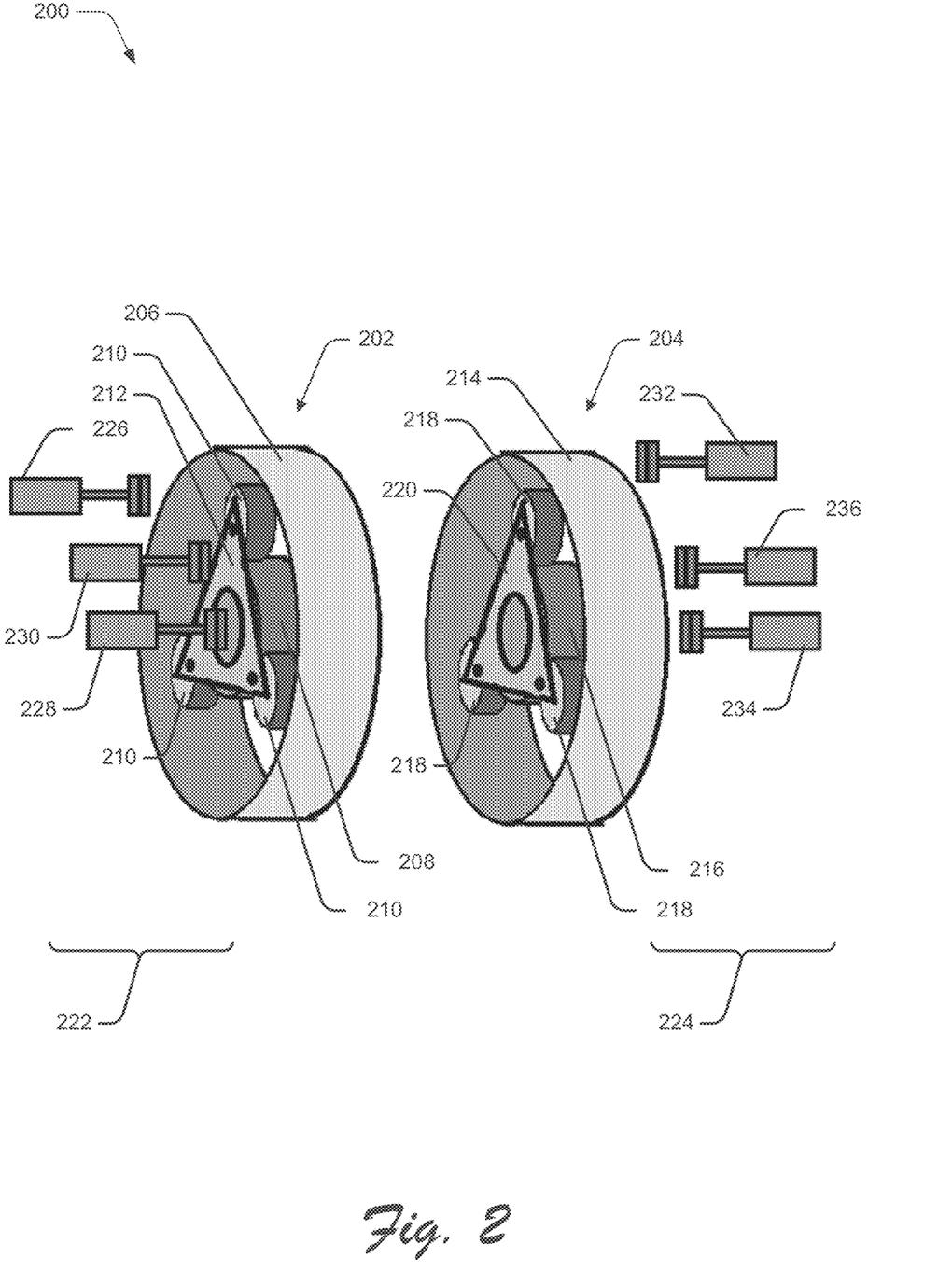
FIG. 2 depicts an epicyclic gear system, including a gear engagement system, in an example implementation for the actuator of FIG. 1.

Referring to FIG. 2, there is shown actuator components 200 of a first model comprising one or more epicyclic gear systems 202, 204. A first epicyclic gear system 202 of the actuator components 200 include a ring gear 206 at an outer boundary of the first gearing system, a sun gear 208 positioned at a center portion of the epicyclic gear system, and two or more planet gears 210 between the ring gear and the sun gear. The two or more planet gears 210 are mounted on a carrier plate 212, and the planet gears revolve in an orbital direction around the sun gear 208 in symmetry, staying equidistant from each other, as supported by the carrier plate. Positioned between the ring gear 206 and the sun gear 208, the planet gears 210 couple mechanically, i.e., mesh, with the inner surface of the ring gear which rotates about the planet gears and the outer surface of the sun gear which rotates within an orbital rotation of the planet gears. Similarly, a second epicyclic gear system 204 of the actuator components 200 include a second ring gear 214, a second sun gear 216, and second planet gears 218 meshed between the second ring gear and the second sun gear and mounted on a second carrier plate 220. The actuator components 200 may include multiple epicyclic gear systems 202, 204 to, in part, share a load subjected to the system to increase the torque capability and reduce energy loss.

Referring to FIGS. 1 and 2, the epicyclic gear system 118, 120, 202, 204 uses an input shaft 104, such as a drive shaft, to provide input rotational force or motion to one of the members of the gear set, which would be the ring gear 206, 214, sun gear 208, 216, or planet gears 210, 218. The epicyclic gear system 118, 120, 202, 204 provides different gearing ratios and change of direction by holding or locking one of the other members in place.

Referring again to FIG. 2, in reference to simple and compound epicyclic gear systems 202, 204, each system may include a gear engagement system 222, 224. Each gear engagement system 222, 224 is configured to receive a gear ratio command from a clutch mechanism and restrict movement of one or two gears of the planetary gears 206-218, in response to the gear ratio command. In particular, the gear engagement system 222, 224 may restrict movement of the ring gear 206, 214, the sun gear 208, 216, the planet gears 210, 218, and/or the carrier plate 212, 220 of the planet gears in response to the gear ratio command. As a result, the output rotational motion of the output shaft 106 is different from the input rotational motion of the input shaft 104 in response to restricting movement of the gear or gears of the planetary gears 206-218. The gear engagement system 222, 224 immobilizes a gear or gears of the planetary gears 206-218 by a mechanical, electrical, or magnetic mechanism of the gear engagement system. For example, the gear engagement system 222, 224 may include a ring gear locking element 226, 232 that extends to a position adjacent the ring gear 206, 214 to restrict movement of the ring gear in response to receiving a gear ratio command. Likewise, the gear engagement system 222, 224 may include a sun gear locking element 228, 234 that extends to a position adjacent the sun gear 208, 216 to restrict movement of the sun gear in response to receiving the gear ratio command, and a planet gear locking element 230, 236 that extends to a position adjacent the carrier plate 212, 220 to restrict movement of the planet gears in response to receiving the gear ratio command. Examples of the mechanical, electrical, or magnetic mechanisms include, but are not limited to, solenoid or other type of clutching mechanism that are activated by mechanical, electrical, or magnetic means and transmit torque mechanically.

The epicyclic gear system 202, 204 provides the capability of selecting torque and speed ranges, based upon a control signal. The selectable torque and speed ranges would be accomplished by the actuator components 200 having the ability to "shift" gears by activating a gear engagement mechanism 222, 224, which would hold or lock one or two of the three members of the epicyclic gear system 202, 204 in place. The actuator components 200 include one or several sets of epicyclic gear systems that are placed in series, i.e., stacked, with one another. By having actuator components 200 equipped with selectable gear ratios, the corresponding actuator 102 provides the ability to have multiple torque and speed ranges available at the output shaft 106. It should be noted that there is an inverse relationship between speed and torque: the actuator output shaft speed is slow when high torque is desired, and the torque is reduced when the actuator speed is increased.

Figure 3:
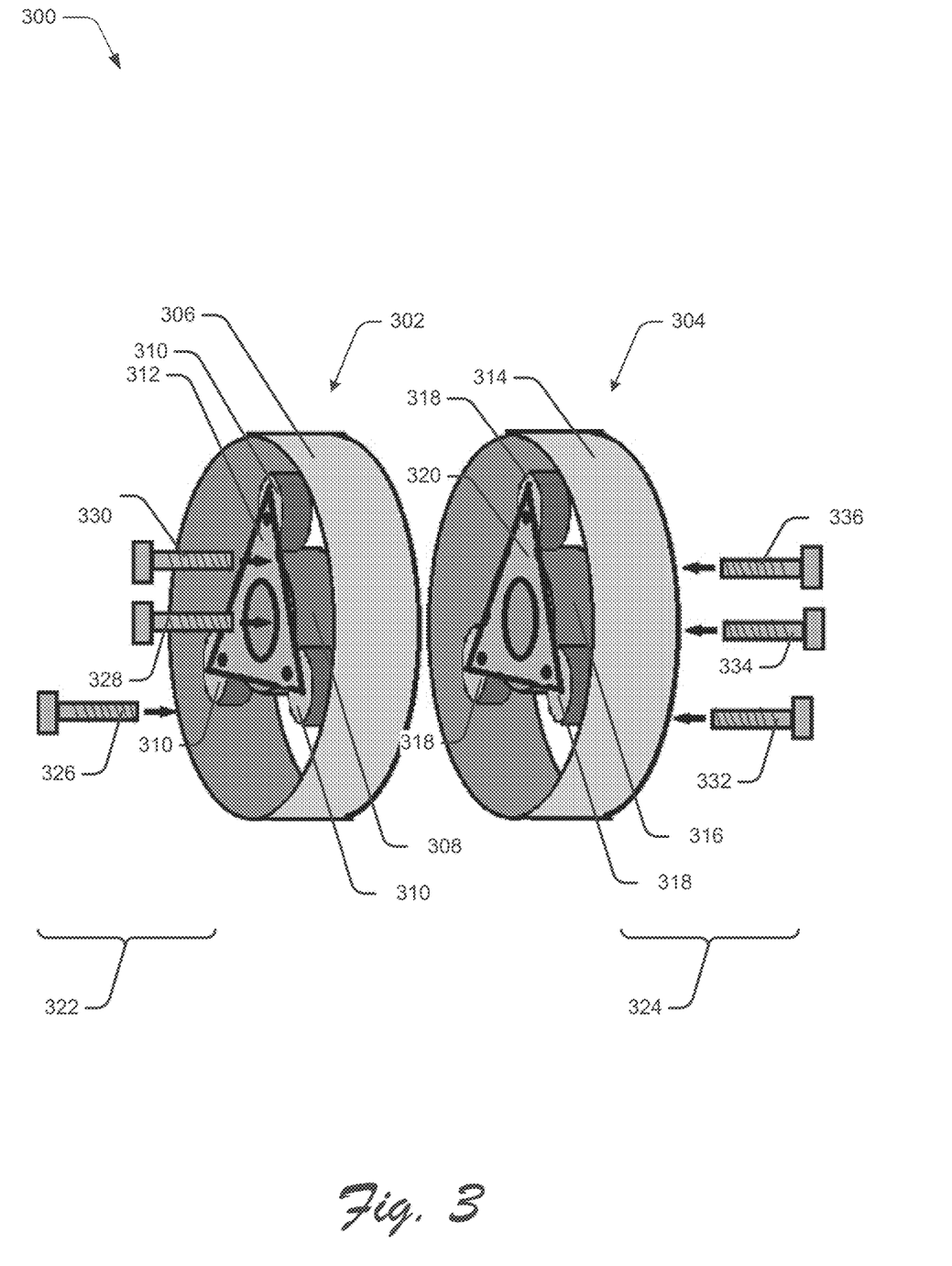
FIG. 3 depict the epicyclic gear system, including another gear engagement system, in another example implementation for the actuator of FIG. 1.

Referring to FIG. 3, there is shown actuator components 300 of a second model comprising one or more epicyclic gear systems 302, 304. Similar to the first and second epicyclic gear systems 202, 204 of the first model, each system of the first and second epicyclic gear systems 302, 304 of the second model 302 includes a ring gear 306, 314, a sun gear 308, 316, two or more planet gears 310, 318 between the ring gear and the sun gear, and a carrier plate 312, 320 supporting the corresponding planet gears. The planet gears 310, 318 couple mechanically, i.e., mesh, with the inner surface of the ring gear 306, 314 which rotates about the planet gears and the outer surface of the sun gear 308, 316 which rotates within an orbital rotation of the planet gears.

The gear engagement systems 322, 324 of the second model differ from the gear engagement systems 222, 224 of the first model. For the first model, the gear engagement system 222, 224 would use some type of clutching mechanism, activated by an input control signal, to hold/lock one or two of the planetary gear members in place. For the second model depicted by FIG. 3, the gear engagement systems 322, 324 may be configured manually, such as installation or customization or prior thereto by a technician, for particular torque and speed ranges that remain selected going forward without requiring further adjustments or changes. For example, the technician may configure the speed and torque ranges of the gear engagement system or systems 322, 324 by positioning or placement of the locking elements 326-336, such as a pin or a screw, adjacent to or through the ring gear 306, 314, a sun gear 308, 316, the planet gears 310, 318, and/or the carrier plate 312, 320. In addition, a configuration decal may be positioned at the outer surface of the actuator housing 116 to identify the inclusion or placement of locking elements in the corresponding epicyclic gear system. Thus, the gear engagement systems 322, 324 of the second model has fixed gear ratios and the desired gear ratio/actuator speed would be selected by using various set pins or screws to lock/hold one or two of the members of the epicyclic gear system 302, 304 set in place. The gear ratio selection would be fixed and left in place until or unless epicyclic gear system 302, 304 is manually modified by an installer, technician, or operator some time thereafter.

Referring still to FIG. 3, in reference to simple and compound epicyclic gear systems 302, 304, each system may include a gear engagement system 322, 324. Each gear engagement system 322, 324 is configured to receive a pin, such as a screw, to restrict movement of one or two gears of the planetary gears 306-318, in response to manual placement of the pin by an installer, technician, or operator. In particular, the gear engagement system 322, 324 may restrict movement of the ring gear 306, 314, the sun gear 308, 316, the planet gears 310, 318, and/or the carrier plate 312, 320 of the planet gears in response to placement of the pin. As a result, the output rotational motion of the output shaft 106 is different from the input rotational motion of the input shaft 104 in response to restricting movement of the gear or gears of the planetary gears 306-318.

Figure 4:
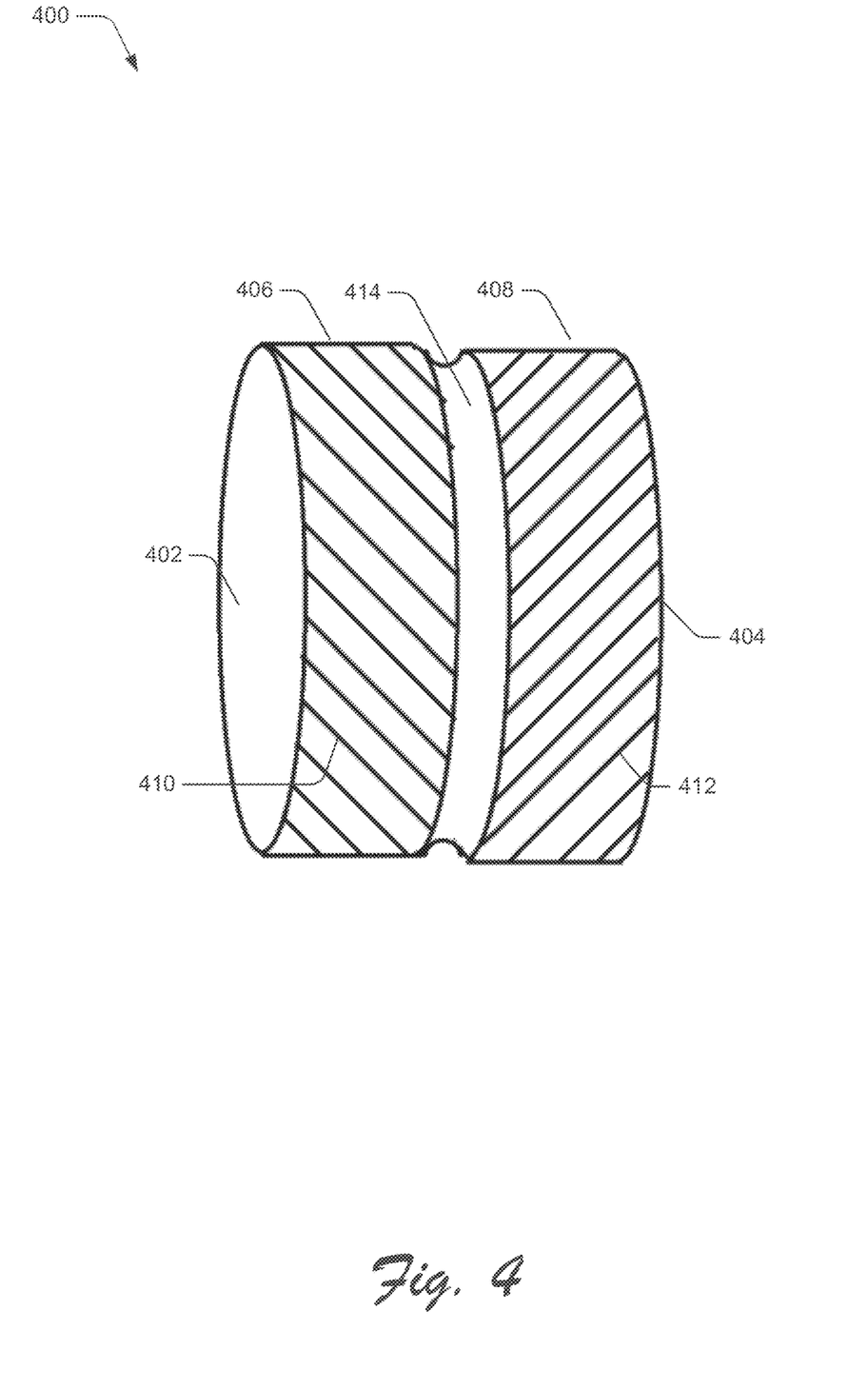
FIG. 4 is a representation of a gear design in an example implementation that may be applied for one or more gears of the epicyclic gear system of FIG. 2 and/or FIG. 3.

Referring to FIG. 4, there is shown a gear design 400 in an example implementation that may be applied for one or more gears of the epicyclic gear system. The gear design 400 includes a first planar side 402 having a circular perimeter and a second planar side 404, opposite the first planar side, having a circular perimeter similar to the circular perimeter of the first planar side. The gear design 400 also includes a first helical gear portion 406 adjacent to the first planar side 402 and a second helical gear portion 408 adjacent to the second planar portion 404 and opposite the first helical gear portion. For one embodiment, the first helical groove portion 406 includes first slanted teeth 410 directed in a first direction and the second helical groove portion 408 includes second slanted teeth 412 directed in a second direction different from the first direction. For another embodiment, which includes the first and second helical groove portions 406, 408, the first and second slanted teeth 410, 412 may be symmetrical relative to each other. For yet another embodiment, the first and second helical groove portions 406, 408 may include a groove 414 between the first and second groove portion such that they are separated from each other by a fixed distance throughout the circumference of the gear design 400. The groove 414 may provide various functions for the gear design 400 such as allowing a lubricant to traverse or be guided from one part of the gear design to another. For still another embodiment, the gear design 400 may include a combination of two or more aspects of the above embodiments. Thus, the gear design 400 may include one or more helical gears having opposing helixes at an outer surface each helical gear and a groove between the opposing helixes.

The gear design 400 may provide various advantages for the embodiments that implement the gear design. The helical gear portions 406, 408 of the gear design 400 including opposing helixes that provides the ability to spread a load across more gear teeth and more surface area. The opposing helixes of the helical gear portions 406, 608 counter the force of thrust, which is present particularly when only one helix is used. By eliminating thrust, a thrust bearing assembly is not necessary. Helical gear portions 406, 408 also provide for noise reduction. In addition, the helical gear portions 406, 408 of the gear design 400 including a groove between opposing helixes of the helical gear portions 406, 408. A gear with opposing helixes may include a groove 414 for applications where lubricants are used. The groove 414 allows lubricants to escape when the gear goes in a direction opposite the "normal" direction. Otherwise, the gear may try to compress a lubricant, which may result in some gear cluster components being stressed or damaged.

The gear design 400 allow for gears to be made of materials such as composites, carbon fibers, or ceramics. Existing actuators gears are often spur gears that consist of sintered powder metal. The metal is required due to the loading force on the gear teeth. By using non-metal high tech materials for the gear design 400, the gear design would lower the cost of manufacturing. The gear design 400 would also reduce the noise of the gears, such as gear whine.

Figure 5:
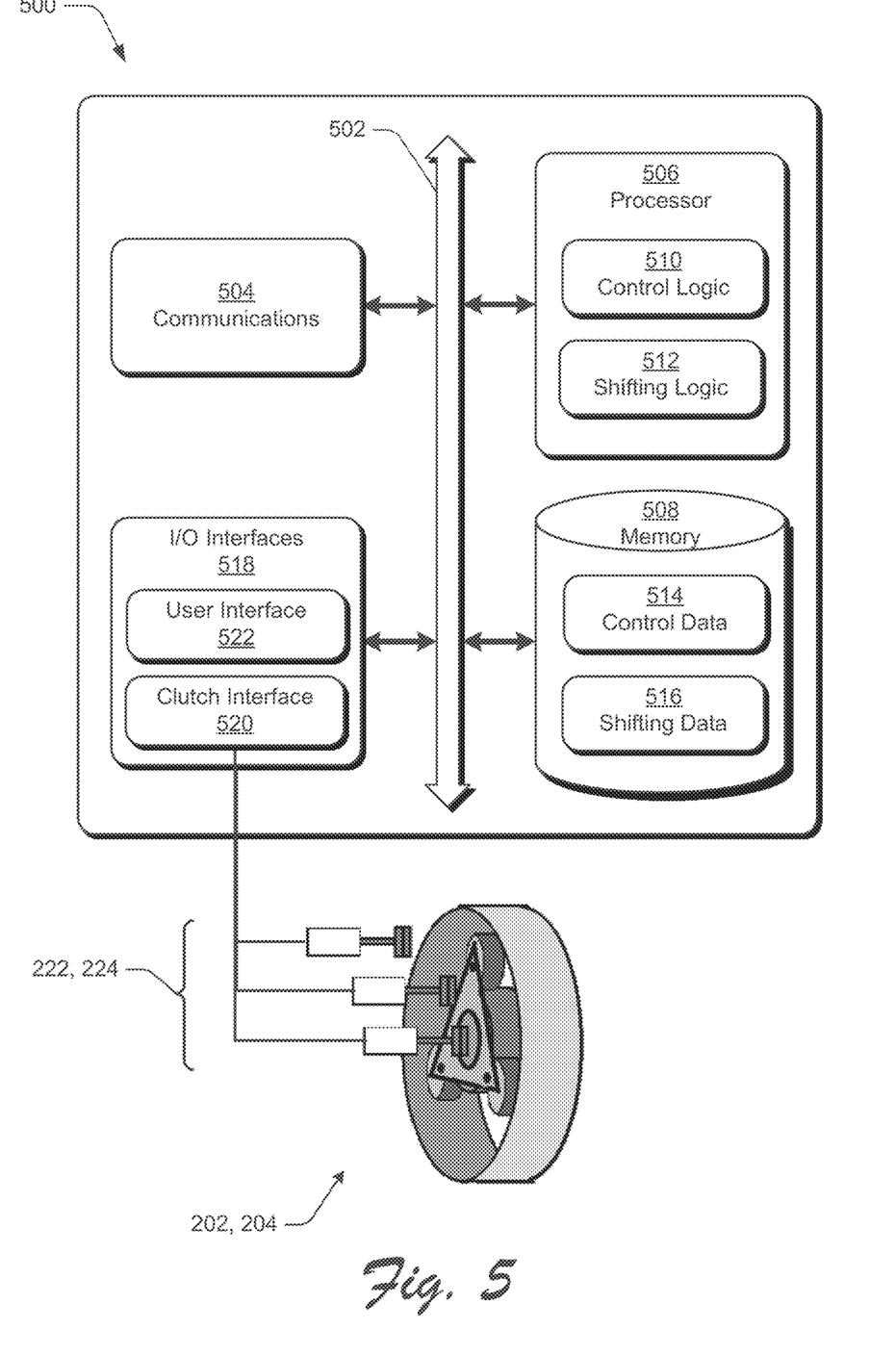
FIG. 5. is a block diagram of a clutch mechanism to control of the gear engagement system of FIG. 2.

FIG. 5 represents example device components 500 of a clutch mechanism that may operate an epicyclic gear system 202, 204 of the first model (represented by FIG. 2), employing the techniques described herein. The device components 500 may comprise a communication bus 502 for interconnecting components directly or indirectly. The device components may further comprise one or more communication components 504 communicating other entities of the alarm system via a wired or wireless link, one or more processors 506, and one or more memory components 508.

The processor 506 may execute code and process data received other components of the device components 500, such as information received at the communication component 504 or stored at the memory component 508. The code associated with the clutch mechanism and stored by the memory component 508 may include, but is not limited to, operating systems, applications, modules, drivers, and the like. An operating system includes executable code that controls basic functions of the dutch mechanism, such as interactions among the various components of the device components 500, communication with external devices via the communication component 504, and storage and retrieval of code and data to and from the memory component 508. Each application includes executable code to provide specific functionality for the processor 506 and/or remaining components of the clutch mechanism. Examples of applications executable by the processor 506 include, but are not limited to, a control logic module 510 to perform operations to manage the general operation of the gear engagement system 222, 224 and a shifting logic module 512 (which may be integral to or separate from the control logic module) to activate or deactivate gear locking elements 226-236 to shift the gear ratio of the gear engagement system(s). For example, the gear engagement system 222, 224 may be configured to receive a gear ratio command from the shifting logic module 512 of the clutch mechanism and restrict movement of one or more gears of the planetary gears in response to receiving the gear ratio command. Data is information that may be referenced and/or manipulated by an operating system or application for performing functions of the clutch mechanism and associated components. Examples of data associated with the clutch mechanism and associated components, stored by the memory component 508, may include, but are not limited to, control data 514 identify instructions for general operations of the gear engagement system 222, 224, and shifting data 516 (which may be integral to or separate from the control data) to identify how gear ratios are associated with restrictions to gear locking elements 226-236 and store corresponding gear ratio commands.

The device components 500 of the clutch mechanism may include one or more interfaces to input and/or output components (I/O interfaces) 518. The I/O interfaces 518 of the device components 500 may include interfaces to one or more visual, audio, mechanical, and/or other components. For example, the I/O interface 518 includes a clutch interface 520 for wired or wireless interconnection with the gear locking elements 226-236 of the gear engagement system 222, 224. As a result, the output rotational motion of the output shaft 106 is different from the input rotational motion of the input shaft 105 in response to restricting movement of the gear or gears of the planetary gears by the clutch interface 520 and one or more gear locking elements 226-236. For some embodiments, the I/O interfaces 518 of the clutch mechanism may also include a user interface 522 for interaction with a user of the clutch mechanism.

It is to be understood that FIG. 5 is provided for illustrative purposes only to represent examples of the device components 500 of the clutch mechanism and is not intended to be a complete diagram of the various components that may be utilized by the appliance. Therefore, the device may include various other components not shown in FIG. 5, may include a combination of two or more components, or a division of a particular component into two or more separate components, and still be within the scope of the present invention.

Figure 6:
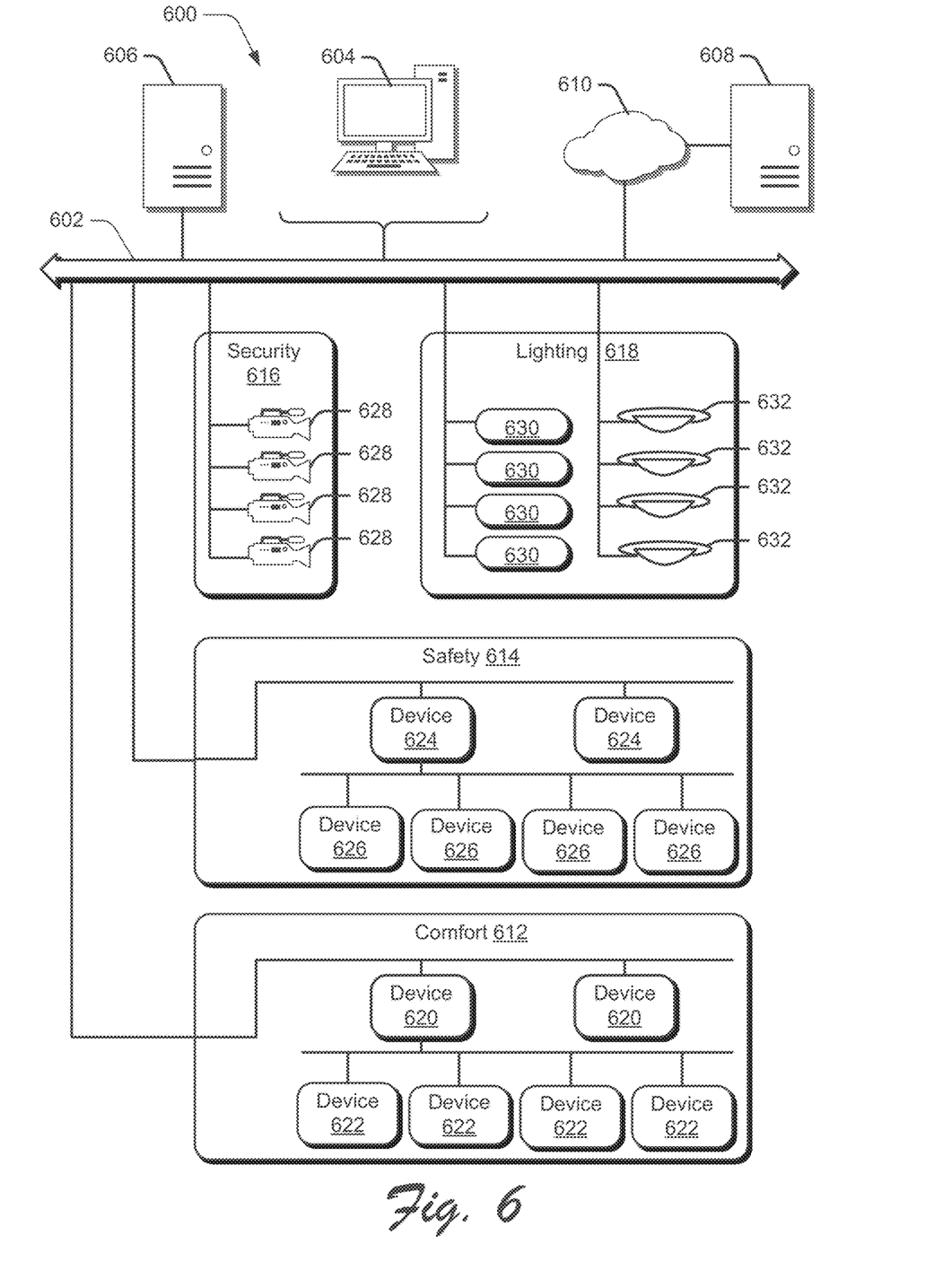
FIG. 6 is a block diagram of a building management system in an example implementation that may utilize the actuator of FIG. 1.

Referring to FIG. 6, there is shown a building management system 600 in an example implementation that may utilize an actuator as described herein. The building management system 600 includes an environmental control system configured to control one or more environmental parameters for a facility, such as temperature, humidity, ventilation, lighting, fire safety, security, and the like. For example, the building management system 600 may comprise one or more network connections or buses 602 for connectivity to components of the system. For one embodiment, the example building management system 600 may comprise one or more management devices, such as a management workstation 604, a management server 606, or a remote management device 608 connecting through a wired or wireless network 610, that allows the setting and/or changing of various controls of the system. While a brief description of the building management system 600 is provided below, it will be understood that the building management system 600 described herein is only one example of a particular form or configuration for a building management system. The system 600 may be implemented in any other suitable manner without departing from the scope of this disclosure.

The management devices 604, 606, 608, are configured to provide overall control and monitoring of the building management system 600. For the illustrated embodiment of FIG. 6, the building management system 600 provides connectivity to subsystems for various environmental parameters such as components of comfort systems 612, safety systems 614, security systems 616, and lighting systems 618. For example, comfort systems 612 may include various devices 620, 622 for monitoring and controlling heating, cooling, and ventilation of areas within a building or group of buildings. Examples of comfort devices include, but are not limited to, stations, field panels, field controllers, field devices, and the like. Some devices 620 may communicate directly with a network connection or bus 602, whereas other devices 622 may communicate through, and perhaps be controlled by, another device. Similarly, safety systems 614 may include various devices 624, 626 for monitoring and controlling fire protection for areas within a building or a group of buildings. Examples of safety devices include, but are not limited to, controllers, control panels, detectors, alarm systems, video surveillance cameras, and the like. Similar to comfort devices, some safety devices 624 may communicate directly with a network connection or bus 602, whereas other safety devices 626 may communicate through, and perhaps be controlled by, another device. As stated above, the illustrated embodiment of the building management system 600 may provide connectivity to subsystems 628 for security systems 616 and other systems, such as video surveillance cameras and motion detectors, for monitoring and controlling various areas within a building or a group of buildings. The lighting systems 618 may include various devices 630, 632 for monitoring and controlling illumination of areas within a building or group of buildings. Examples of lighting devices include, but are not limited to, lighting sensors such as occupancy sensors, lighting controllers such as UV light controllers, lighting switches, lighting gateways, lighting hubs, lighting servers, and the like. Each of the devices described above, particularly the devices of the comfort systems 612 and the safety systems 614, may operate or be associated with dampers, valves, or other flow control devices controlled by an actuator having an epicyclic gear system as described herein.

Figure 7:
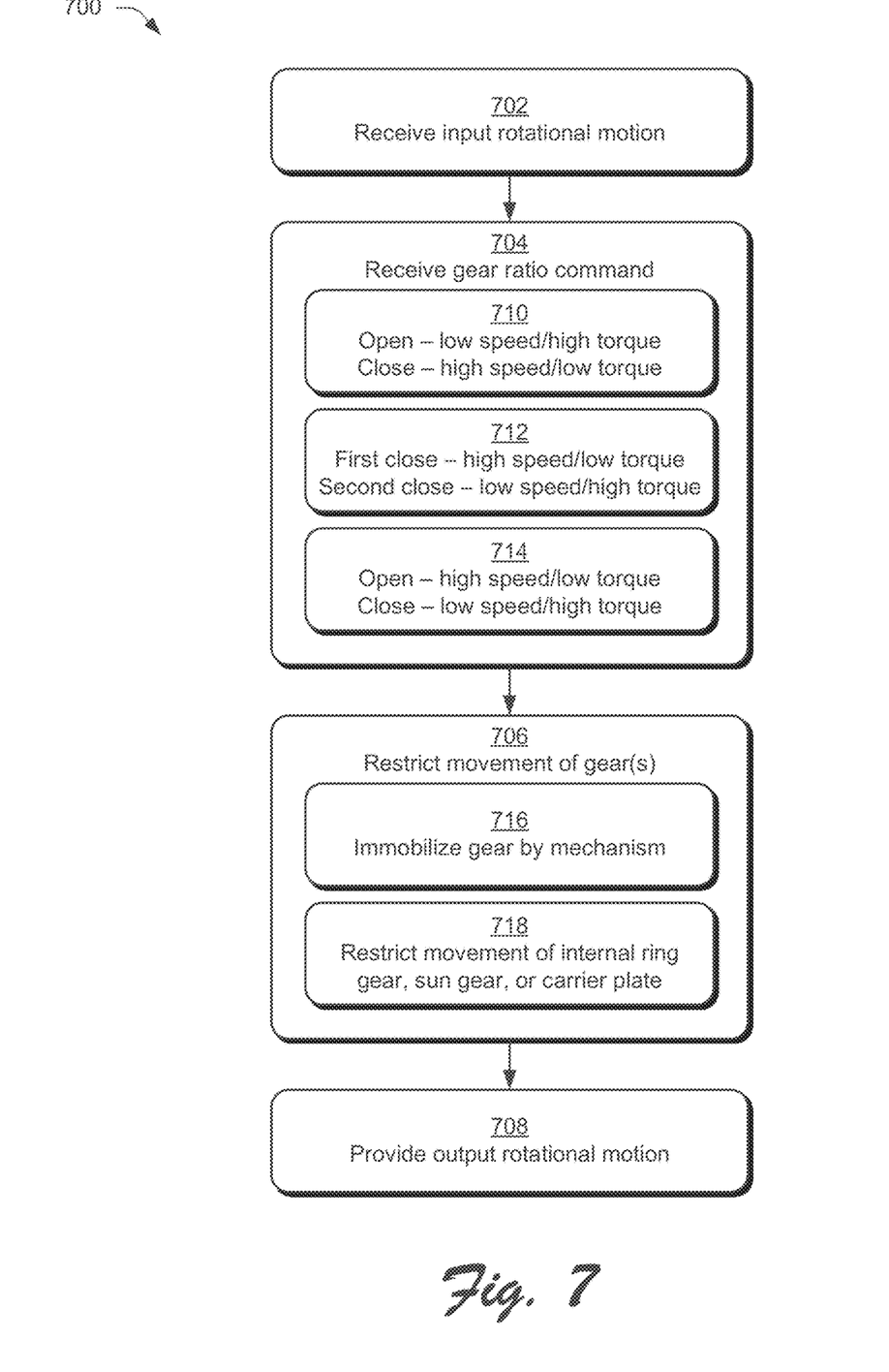
FIG. 7 is a flow diagram of an example operation of the epicyclic gear system represented by FIGS. 2 and 5.

Referring to FIG. 7, there is shown a flow diagram of an example operation of the epicyclic gear system of the first model, i.e., shift-on-the-fly model. The actuator includes the ability to shift gears and switch from low-speed/hi-torque gear ratio to high-speed low-torque gear ratio. A locking mechanism, such as a mechanical, electrical, or magnetic clutch mechanism, may hold one or two of the planetary members in place and then switch or shift to other members being restrained to provide the shifting action, which results in speed and torque changes.

Certain applications may benefit from epicyclic gear system of the first model. For example, for a fire-smoke damper or an inlet guide vane for a centrifugal chiller, the epicyclic gear system may provide a slow speed high-torque opening of the actuator and, then, the actuator may shift to a high-speed low-torque closing. The ability to have an actuator shift gears, would be beneficial for applications where the torque force that is required to open the actuator is substantial, i.e., slow opening. In such case, reduction gearing would be selected and used to provide the necessary force to drive open spring-loaded dampers and overcome an internal fail-safe spring within the actuator. When fast closing and reverse rotation is needed, a different gear ratio could be commanded from a control signal or lack of control signal for fail safe applications.

The ability to change rotation by holding or locking one or two of the gear set members in place would allow for a uni-directional electric motor with a single motor winding, instead of using a bi-directional electrical motor with two motor windings and a capacitor. This could possibly lower the cost of manufacturing provided that the cost of the clutching mechanism would be of a lower cost that the bi-directional electric motor.

By having the ability to shift gears, we could use a fast speed to get to close to the desired actuator position quickly, but then downshift, so that we can be very precise in the exact positioning of the actuator. By increasing the precision of the actuator positioning through gear reduction, this give us more "points of control" within the range of actuator positions. Thus, different shifting sequences may be selected based upon an input control signal. For example, a main gas valve for boilers may apply a particular shifting sequence for closing the valve. The epicyclic gear system may provide high-speed low-torque closing for a majority of the closing stroke, then shift to slow-speed high-torque for the remainder of the close off. For a main gas valve for boilers, in particular, the valves have a guillotine style plug & seat arrangement which is designed to shear off any debris or contamination in the valve seat to forcefully close and seat the gas valve. Thus, for this particular type of valve, the epicyclic gear system may provide high-speed low-torque closing for 90% or more of the closing stroke, then shift to slow-speed high-torque for the remainder 1% to 10% of the close off.

As shown in FIG. 7, the epicyclic gear system 118, 120 of a flow control actuator provides selectable torque and speed ranges. The epicyclic gear system 118, 120 receives 702 an input rotational motion at an input shaft 104 of the epicyclic gear system, in which the epicyclic gear system including a plurality of planetary gears. The epicyclic gear system 118, 120 then receives, at a gear engagement system 222, 224, a gear ratio command from a clutch mechanism. Next, the epicyclic gear system 118, 120 restricts, by the gear engagement system 222, 224, movement of one or more gears of the planetary gears in response to the gear ratio command. Thereafter, the epicyclic gear system 118, 120 provides 708 an output rotational motion at an output shaft 106 of the epicyclic gear system based on the input rotational motion at the input shaft 104. The output rotational motion is different from the input rotational motion in response to, i.e., due to the fact that, movement of the gear or gears of the planetary gears has been restricted by the gear engagement system 222, 224 of the epicyclic gear system 118, 120.

As stated above, the gear engagement system 222, 224 of the epicyclic gear system 118, 120 receives a gear ratio command from a clutch mechanism. For one embodiment, the epicyclic gear system 118, 120 may receive 710 a first gear ratio command associated with a low speed and high torque operation to increase flow, i.e., opening, and the epicyclic gear system may receive a second gear ratio command associated with a high speed and low torque operation to decrease flow, i.e. closing. For another embodiment, the epicyclic gear system 118, 120 may receive 712 a first gear ratio command associated with high speed and low torque operation to decrease flow for a first time period, and the epicyclic gear system may receive a second gear ratio command associated with low speed and high torque operation to decrease flow for a second time period following the first time period. For example, as described above, the system 118, 120 may provide high-speed low-torque closing for 90% or more of the closing stroke, then shift to slow-speed high-torque for the remainder 1% to 10% of the close off. For yet another embodiment, the epicyclic gear system 118, 120 may receive 714 a first gear ratio command associated with high speed and low torque operation to increase flow, i.e., opening, and the epicyclic gear system may receive a second gear ratio command associated with low speed and high torque operation to decrease flow, i.e., closing.

As stated above, the gear engagement system 222, 224 of the epicyclic gear system 118, 120 restricts movement of one or more gears of the planetary gears. For one embodiment, the epicyclic gear system 118, 120 may immobilize 716 a gear of the planetary gears by a mechanical, electrical, or magnetic mechanism of the gear engagement system. For another embodiment, the planetary gears may include a ring gear, a sun gear, and multiple planet gears. The planet gears may be mounted to a carrier plate and coupled mechanically to the ring gear and the sun gear. For still another embodiment, the epicyclic gear system 118, 120 may restrict 718 movement of the ring gear, the sun gear, or the carrier plate in response to the gear ratio command.

Figure 8:
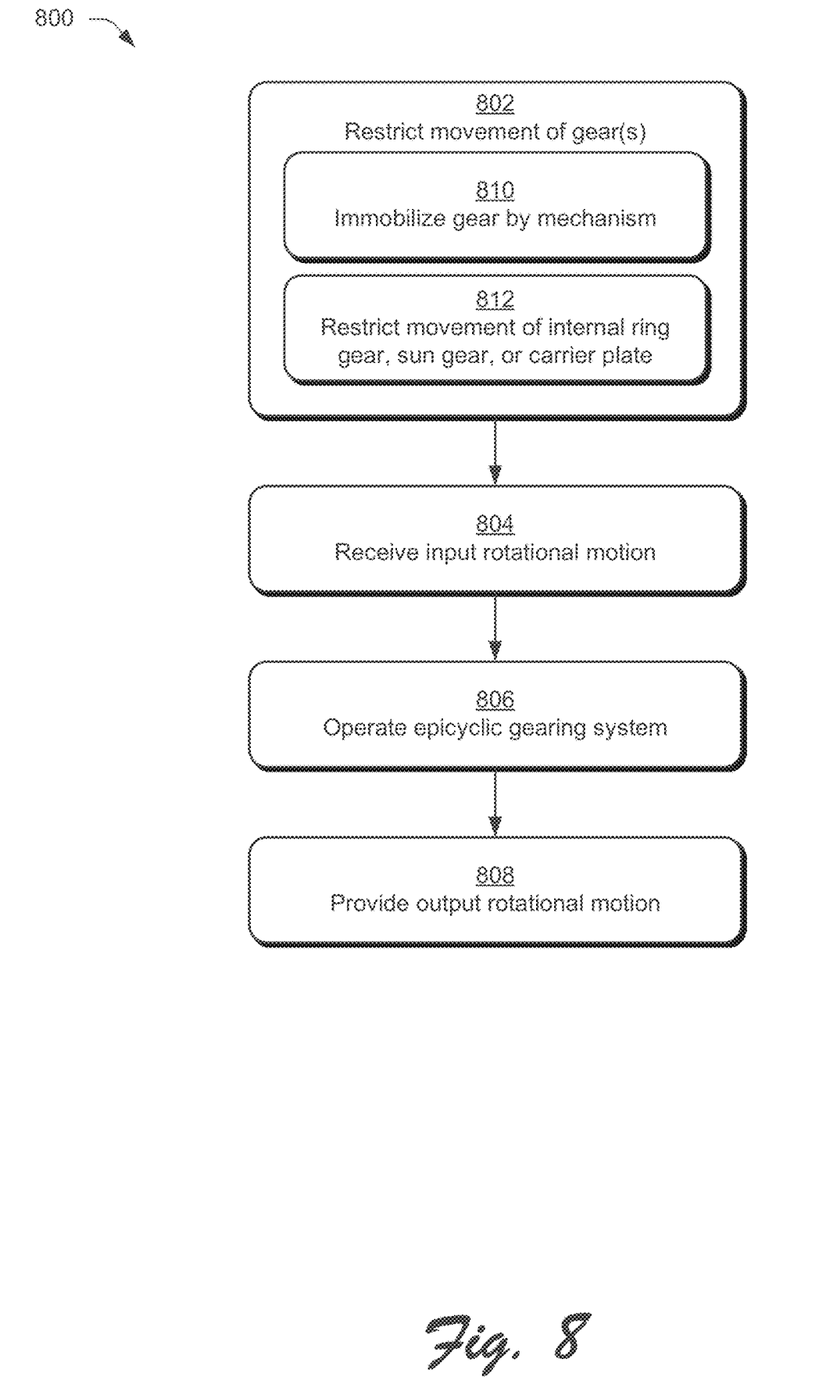
FIG. 8 is a flow diagram of an example operation of the epicyclic gear system represented by FIG. 3.

Referring to FIG. 8, there is shown a flow diagram of an example operation of the epicyclic gear system of the second model, i.e., fixed ratio model. The gear engagement systems 322, 324 of the epicyclic gear system 118, 120 may be configured manually for particular torque and speed ranges that remain selected going forward without requiring further adjustments or changes. For example, an installer, technician, or operator may configure the speed and torque ranges of the gear engagement system or systems 322, 324 by positioning or placement of the locking elements 326-336, such as a pin or a screw, adjacent to or through one or more gears of the planetary gears.

As shown in FIG. 8, the epicyclic gear system 118, 120 of a flow control actuator provides selectable torque and speed ranges. In contrast to the first model described above, the epicyclic gear system 118, 120 of the second model restricts 802, by the gear engagement system 322, 324, movement of one or more gears of the planetary gears in response to the gear ratio command. In particular, one or more locking elements 326-336, such as a pin or a screw, are positioned or placed adjacent to or through the ring gear 306, 314, a sun gear 308, 316, the planet gears 310, 318, and/or the carrier plate 312, 320. After configuring the epicyclic gear system 118, 120 in this manner, the actuator may be installed or setup for flow control. Sometime thereafter, the epicyclic gear system 118, 120 receives 804 an input rotational motion at an input shaft 104 of the epicyclic gear system, in which the epicyclic gear system including a plurality of planetary gears. The epicyclic gear system 118, 120 then operates 806 in accordance with the configuration which restricts movement of one or more gears of the planetary gears. Thereafter, the epicyclic gear system 118, 120 provides 808 an output rotational motion at an output shaft 106 of the epicyclic gear system based on the input rotational motion at the input shaft 104. The output rotational motion is different from the input rotational motion in response to, i.e., due to the fact that, movement of the gear or gears of the planetary gears has been restricted by the gear engagement system 322, 324 of the epicyclic gear system 118, 120.

As stated above, the gear engagement system 322, 324 of the epicyclic gear system 118, 120 receives a gear ratio command from a clutch mechanism. For one embodiment, the epicyclic gear system 118, 120 may immobilize 810 a gear of the planetary gears by a mechanical, electrical, or magnetic mechanism of the gear engagement system. For another embodiment, the planetary gears may include a ring gear, a sun gear, and multiple planet gears. The planet gears may be mounted to a carrier plate and coupled mechanically to the ring gear and the sun gear. For still another embodiment, the epicyclic gear system 118, 120 may restrict 812 movement of the ring gear, the sun gear, or the carrier plate in response to the gear ratio command.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An epicyclic gear system of a flow control actuator for providing selectable torque and speed ranges, the epicyclic gear system comprising:
    an input shaft configured to receive an input rotational motion;
    a gear engagement system configured to receive a first gear ratio command from a clutch mechanism associated with high speed and low torque operation to decrease flow for a first time period, a second gear ratio command associated with a low speed and high torque operation to decrease flow for a second time period following the first time period, and restrict movement of at least one gear of a plurality of planetary gears in response to each of the first and second gear ratio commands; and
    an output shaft configured to provide an output rotational motion based on the input rotational motion at the input shaft, the output rotational motion being different from the input rotational motion in response to restricting movement of the at least one gear of the plurality of planetary gears.

2. The epicyclic gear system as described in claim 1, wherein the gear engagement system immobilizes a gear of the plurality of planetary gears by a mechanical and/or electrical and/or magnetic mechanism of the gear engagement system.

3. The epicyclic gear system as described in claim 1, wherein:
    the plurality of planetary gears includes a ring gear, a sun gear, and a plurality of planet gears, the plurality of planet gears being mounted to a carrier plate and coupled mechanically to the ring gear and the sun gear; and
    the gear engagement system is configured to restrict movement of at least one of the ring gear, the sun gear, or the carrier plate in response to each of the first and second gear ratio commands.

4. The epicyclic gear system as described in claim 1, wherein at least one helical gear of the plurality of planetary gears includes an outer surface and opposing helixes at the outer surface of the at least one gear and a groove between the opposing helixes.

5. The epicyclic gear system as described in claim 1, wherein the gear engagement system is further configured to receive from the clutch mechanism
    a third gear ratio command associated with a low speed and high torque operation to increase flow.

6. The epicyclic gear system as described in claim 1, wherein the gear engagement system is further configured to receive from the clutch mechanism
    a third gear ratio command associated with a high speed and low torque operation to increase flow.

7. A method for an epicyclic gear system of a flow control actuator for providing selectable torque and speed ranges, the method comprising:
    receiving an input rotational motion at an input shaft of the epicyclic gear system, the epicyclic gear system including a plurality of planetary gears;
    receiving, at a gear engagement system, a gear ratio command from a clutch mechanism, wherein receiving the gear ratio command from the clutch mechanism comprises:
        receiving a first gear ratio command associated with high speed and low torque operation to decrease flow for a first time period; and
        receiving a second gear ratio command associated with low speed and high torque operation to decrease flow for a second time period following the first time period;
    restricting, by the gear engagement system, movement of at least one gear of the plurality of planetary gears in response to the gear ratio command; and
    providing an output rotational motion at an output shaft of the epicyclic gear system based on the input rotational motion at the input shaft, the output rotational motion being different from the input rotational motion in response to restricting movement of the at least one gear of the plurality of planetary gears.

8. The method as described in claim 7, wherein receiving the gear ratio command from the clutch mechanism further comprises
    receiving a third gear ratio command associated with a low speed and high torque operation to increase flow.

9. The method as described in claim 7, wherein receiving the gear ratio command from the clutch mechanism further comprises
    receiving a third gear ratio command associated with high speed and low torque operation to increase flow.

10. The method as described in claim 7, wherein restricting movement of the at least one gear of the plurality of planetary gears includes immobilizing a gear of the plurality of planetary gears by a mechanical and/or electrical and/or magnetic mechanism of the gear engagement system.

11. The method as described in claim 7, wherein:
the plurality of planetary gears includes an ring gear, a sun gear, and a plurality of planet gears, the plurality of planet gears being mounted to a carrier plate and coupled mechanically to the ring gear and the sun gear; and
restricting movement of the at least one gear of the plurality of planetary gears includes restricting movement of at least one of the ring gear, the sun gear, or the carrier plate in response to the gear ratio command.

12. The method as described in claim 7, wherein at least one helical gear of the plurality of planetary gears includes opposing helixes at an outer surface of the at least one gear and a groove between the opposing helixes.

13. An epicyclic gear system of a flow control actuator for providing selectable torque and speed ranges, the epicyclic gear system comprising:
an input shaft configured to receive an input rotational motion;
a locking pin configured to restrict movement of at least one gear of a plurality of planetary gears, the locking pin having a first configuration associated with high speed and low torque operation to decrease flow for a first time period, and the locking pin having a second configuration associated with low speed and high torque operation to decrease flow for a second time period following the first time period; and
an output shaft configured to provide an output rotational motion based on the input rotational motion at the input shaft, the output rotational motion being different from the input rotational motion in response to restricting movement of the at least one gear of the plurality of planetary gears.

14. The epicyclic gear system as described in claim 13, wherein:
the plurality of planetary gears includes a ring gear, a sun gear, and a plurality of planet gears, the plurality of planet gears being mounted to a carrier plate and coupled mechanically to the ring gear and the sun gear; and
the locking pin is configured to restrict movement of at least one of the ring gear, the sun gear, or the carrier plate.

15. The epicyclic gear system as described in claim 13, wherein at least one helical gear of the plurality of planetary gears includes an outer surface and opposing helixes at the outer surface of the at least one gear.

16. The epicyclic gear system as described in claim 15, wherein at least one helical gear of the plurality of planetary gears includes a groove between the opposing helixes.

* * * * *